No. 696,237. Patented Mar. 25, 1902.
J. C. HENRY, Dec'd.
S. A. HENRY, Executrix.
CONTROLLER FOR ELECTRIC RAILWAYS OR VEHICLES.
(Application filed Dec. 14, 1899.)
(No Model.)
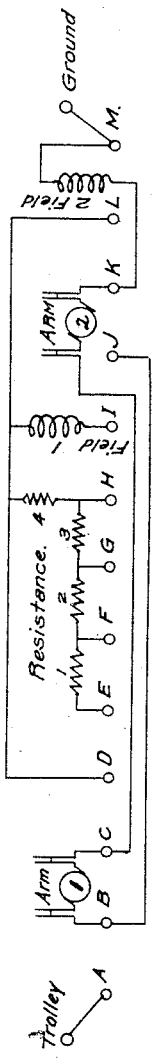
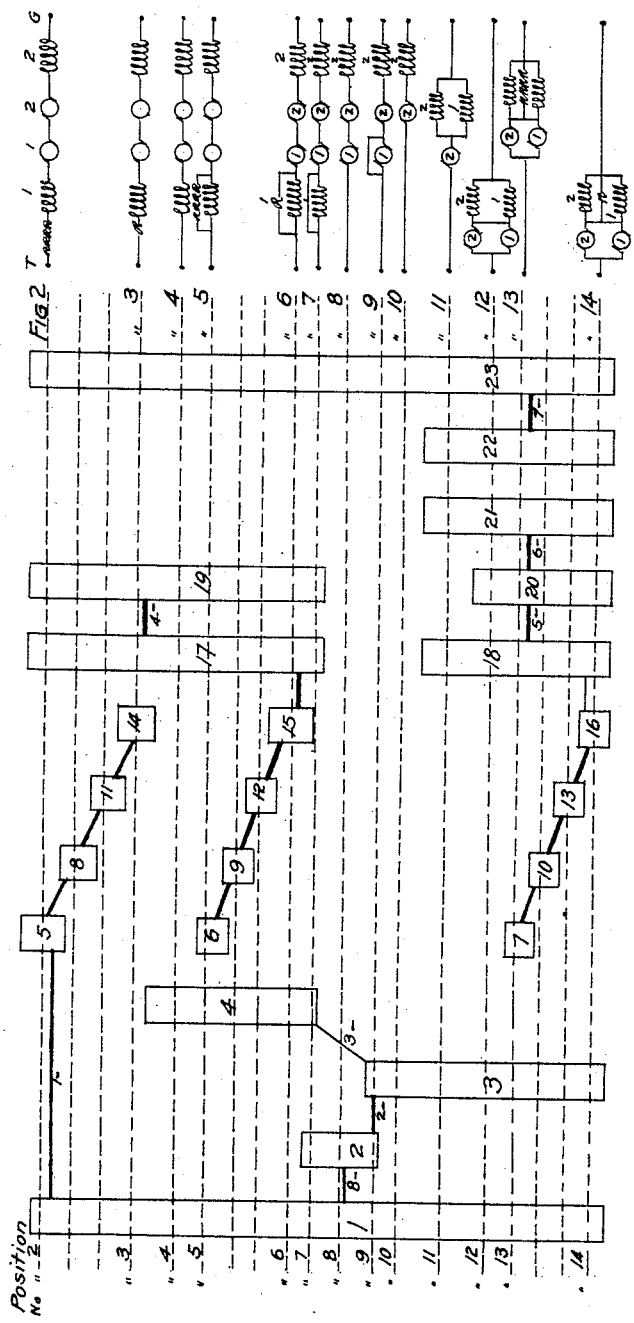
WITNESSES:
Inventor
John C. Henry.

UNITED STATES PATENT OFFICE.

JOHN C. HENRY, OF DENVER, COLORADO; SUSIE A. HENRY, EXECUTRIX OF SAID JOHN C. HENRY, DECEASED, ASSIGNOR TO STANLEY ELECTRIC MANUFACTURING COMPANY, A CORPORATION OF NEW JERSEY.

CONTROLLER FOR ELECTRIC RAILWAYS OR VEHICLES.

SPECIFICATION forming part of Letters Patent No. 696,237, dated March 25, 1902.

Application filed December 14, 1899. Serial No. 740,282. (No model.)

*To all whom it may concern:*

Be it known that I, JOHN C. HENRY, a citizen of the United States, residing in Denver, county of Arapahoe, State of Colorado, have invented certain new and useful Improvements in Electric Railways or Vehicles, &c., of which the following is a specification.

The invention relates to improvements in controllers for the manipulation of a pair of electric motors. It is of the class known as "series multiple," being arranged so that the motor may be connected to the work in series, singly, or in parallel relation and is an improvement on my Patent No. 500,066, of June 20, 1893.

The improvement consists, mainly, in providing means whereby the motors may be changed gradually from series to parallel relation without flashing at the contacts, mechanical shocks to the car or machinery, or abnormal electric or magnetic effects. The changes are effected without interruption of the main circuit by the insertion of wasteful resistance, as is the almost universal practice. In my observation of the operation of electric cars I have noticed that where a pair of motors are connected in series it frequently occurs on starting that one motor will run fast while the other is at a stand, or nearly so. In such a case it is evident that the potential of the motor running instead of being one-half of that of the line is near to the full-line potential, while the voltage of the idle motor is about zero instead of being one-half of that from the line. In other words, one motor is doing all of the work, while the other one is idle. I have noticed that this change came about automatically when there was better adhesion between one pair of car-wheels and the track-rail than the other and that it was effected without mechanical shocks to the machinery or car and without flashing at the motor-brushes. In my improved form of controller I take advantage of these observations and duplicate the effects, so as to enable me to remove one motor from the series circuit gradually without interruption of the main circuit or the insertion in such main circuit of wasteful resistance. I accomplish this by putting a shunt resistance around the field of the motor to be cut out, which will be referred to as "No. 1," and gradually decreasing it to a complete short circuit. The effect is the motor's voltage is smoothly decreased to zero and that of its mate—*i. e.*, No. 2— doubled without violent fluctuations in the circuit. The armature whose resistance is small is next short-circuited, leaving one motor—*i. e.*, No. 2—to propel the car for advantages hereinafter to be referred to. I next reverse and connect the idle field of No. 1 motor in parallel with the field of No. 2 motor. This furnishes an additional path for the current. It decreases the single motor's resistance and increases the current through it and the speed of the armature. It also excites the fields of the idle armature, so that when its armature (reversed) is connected in the circuit an abnormal rush of current is resisted. Thus the motors may be connected in parallel without the insertion of dead resistance to prevent mechanical shocks, &c. The effects may be better understood by the following explanation: Suppose we have a pair of motors connected in parallel driving a car at a speed of sixteen miles per hour, each using twenty (20) amperes. If we should open the circuit on one of the motors, the car speed would drop, say, twenty-five per cent.—*i. e.*, to, say, twelve miles per hour—while the circuit in the single motor would increase to thirty (30) amperes. Now if we put as a shunt around the field of motor No. 2 the field-coils of motor No. 1 the single motor would take more current—say forty (40) amperes—which would drive the car at the same speed which both motors previously did when combined. Now as the field of motor No. 1 is in the circuit—*i. e.*, used as a shunt for motor No. 2—it is evident that when its armature is connected there can be no rush of current through motor No. 1. It is also evident that this act simultaneously reduces the current to motor No. 2 as it increases its back electromotive force, which slows it up, and that armature No. 2, running at the same speed under fields of the same strength, will take no more current, and that combined they run the car at the same speed as the one motor did with shunted fields. Under these circumstances there can be no violent electrical or mechanical action when the idle motor is connected to the work in parallel. This arrangement leaves the motors' fields connected at both ends, maintaining a balance between them, and providing a connection, so that a single shunt resistance may be used to speed up both of them instead of one for each motor, such as is ordinarily employed. On withdrawing one motor from the circuit the armature is disconnected without flashing, as there can be no back kick caused by the self-induction from the field to project the arc when the field is short-circuited on its mate. When the field is removed, the arc is small, as the drop in voltage between its terminals is very low as compared with the main pressure.

In the drawings, Figure 1 represents a development of the improved controller. Figs. 2 to 14, inclusive, represent diagrams of the circuits when the stationary contact-fingers A to M, inclusive, engage the adjustable contacts in the developments, which are numbered from one (1) to twenty-three, (23,) inclusive.

The various combinations shown in the diagrams are effected when the contact-fingers engage the adjustable contacts on the position-lines corresponding to the diagrams of the same numbers. To illustrate, suppose the contact-fingers were made to engage with the switch on "position-line" 2. The current would pass from trolley A to contact 1, thence by connection 1 to contact 5, and thence through the resistance-sections 1, 2, 3, and 4 to field No. 1, thence from finger I to contacts 17, wire 4, contacts 19, finger J, through armature 1, armature 2, and field 2 to ground, thus completing the circuit, as indicated in the diagram Fig. 2. With the contact-fingers on position-line 3 the course of the current would be the same as in figure No. 2, except that the resistance-sections 1, 2, and 3 are short-circuited by contact 14 engaging with finger H. (Shown in Fig. 3.) With the contact-fingers on the position-line 4 the current follows the same course, except that all of the resistance is short-circuited, as shown in Fig. 4, by contact-finger D engaging contact 4, which connects trolley directly with field No. 1. In positions 5, 6, and 7 the field of motor No. 1 is gradually short-circuited, as shown in diagrams 5, 6, and 7. In position 5 all of the resistance is included in this shunt, one end of the field making connection through finger I, contacts 17, 15, 12, 9, and 6, to finger E, the other end being connected through finger D to the trolley through contacts 4, 3, 2, and 1. In position 7 the field is shunted entirely from the circuit, as finger B is connected with contacts 2 and 1 to the trolley-finger A. The current is consequently taken direct to armature No. 1, as shown in diagram 7. This leaves the current passing freely through the low-resistance armature No. 1 without its cutting lines of force. When the finger I leaves contact 17 and the finger D leaves contact 4, the terminals of field 1 are disengaged from all other connections, as shown in diagram 8, leaving No. 2 motor alone working. In position 9 the armature of No. 1 is short-circuited, as shown in diagram 9, by the finger B engaging contact 2 and the finger C engaging the contact 3, contacts 2 and 3 being connected by wire 2. When finger B leaves contact 2, the entering side of No. 1 armature is removed from the circuit. The current then passes directly through motor No. 2. In position 11 the field of No. 1 motor is reversed and placed as a shunt in parallel with the fields of motor No. 2 by finger I connecting with contact 18 and the leaving side of armature 2 through contact 20 and 21, and the other end of the field connecting through finger L, contacts 22 and 23, to the ground at finger M, as shown in diagram 11. In position 12 armature 1 is reversed and connected in parallel with armature No. 2 by contact-finger J engaging contact 20. In the subsequent positions 13 and 14 the motors are speeded up by shunting variable resistance in parallel with the fields. In position 13 all of the resistance is around the field-circuit. The resistance is permanently connected to field No. 1 at one end, while the other end of the resistance is connected through finger E, contacts 7, 10, 13, 16, and 18, to the other end of field No. 1 through fingers I. In position 14 the current takes the same course, except that sections 1, 2, and 3 of the resistance are short-circuited by finger H engaging contact 16, thence by contacts 18 engaging finger I.

Having thus described my invention, what I claim as new therein, and desire to secure by Letters Patent, is—

1. In a series-parallel controller where the fields and armatures are ordinarily connected in series, contacts arranged for disconnecting one of the motors from the circuit and connecting its field in parallel with the field of the other motor and subsequently connecting its armature to the circuit in parallel with the other armature.

2. In a series-parallel controller contacts arranged for disconnecting one of the motors from the circuit and connecting it in parallel with its mate establishing a cross connection between the armature and fields of the separate motors and a resistance connection between the said cross connection and the field-terminals.

3. In a series-parallel controller, contacts arranged for disconnecting one of the motors from the circuit and connecting it in parallel with its mate, establishing a cross connection between the armature and fields of the separate motors and a variable-resistance connection between the said cross connection and the field-terminals.

4. A controller for regulating a pair of series electric motors, comprising contacts adapted to first connect the motors in series relation, then to shunt through a resistance and finally through a short circuit, the field-magnet of one of the motors, thereby increasing the voltage of one of the motors by decreasing the voltage of its mate; and contacts adapted to subsequently remove the latter motor, and then connect its field, and afterward its armature in parallel relation with the field and armature of the opposite motor.

5. A controller for regulating a pair of series electric motors, which comprises contacts adapted and arranged to first connect the motors in series relation, then shunt the field-magnet of one of the motors through a resistance and finally through a short circuit, thereby gradually increasing the voltage of one of the motors by decreasing the voltage of its mate, and contacts adapted and arranged to subsequently remove the latter motor in sections, and then connect its field and afterward its armature in parallel relation with the field and armature of the opposite motor.

6. A controller for changing a pair of motors from series to parallel, which comprises contacts adapted and arranged to disconnect one of the motors from the circuit, contacts adapted to place the field of the disconnected motor in shunt with the field of the connected motor, thereby speeding up the single motor by weakening its field, and magnetizing the field of the other motor, and contacts for connecting the second armature to the circuit in parallel.

7. A controller for regulating a pair of series electric motors, which comprises contacts adapted and arranged to first connect the motors in series relation, then shunt the field of one motor so as to gradually increase the voltage of one of the motors by decreasing the voltage of its mate, contacts adapted and arranged for subsequently removing the latter motor, and then connecting its field and afterward its armature in parallel relation with the field and armature of the opposite motor.

In testimony whereof I have hereunto set my hand and seal, this 11th day of December, A. D. 1899, in the presence of two witnesses.

JOHN C. HENRY. [L. S.]

Witnesses:
ELLA M. HAYES,
MARY HAMPTON LLOYD.